United States Patent

McBride, Jr.

[15] 3,643,142
[45] Feb. 15, 1972

[54] AC MOTOR CONTROL SYSTEM UTILIZING A SELECTIVELY ENERGIZABLE SEMICONDUCTOR SWITCH MEANS

[72] Inventor: Lyle E. McBride, Jr., Norton, Mass.
[73] Assignee: Texas Instruments Incorporated, Dallas, Tex.
[22] Filed: June 2, 1970
[21] Appl. No.: 42,656

[52] U.S. Cl. .................... 318/221 R, 318/227, 318/229
[51] Int. Cl. ........................................................ H02p 1/44
[58] Field of Search .................. 318/221 R, 221 E, 227, 229

[56] References Cited

UNITED STATES PATENTS

3,544,869  12/1970  Plouffe et al. ................. 318/227 X

*Primary Examiner*—Gene Z. Rubinson
*Attorney*—Harold Levine, Edward J. Connors, Jr., John A. Haug, James P. McAndrews and Gerald B. Epstein

[57] ABSTRACT

A control system is disclosed for an electrical motor having a run winding and a start winding. The system includes a gate-controlled current switch device connected between the start winding and a source of power as well as trigger means including a thermistor adapted for operation in a self-heating mode coupled to the gate of the current switch device. The trigger means is adapted to apply triggering current to the gate only for a predetermined time interval to cause sufficient self-heating of the thermistor for effecting operation thereof in a high-resistance mode so as to cause a reduction in the flow of current therethrough and effect deenergization of the switch device at the expiration of the predetermined time interval. Means are also provided for energizing the start winding and the trigger means to permit current to flow to the start winding during the predetermined time interval in order to effect starting of the motor. In addition, the system may include a thermal protection means coupled to the motor in order to disrupt the flow of current to the run winding in response to a sensed motor temperature in excess of a preselected temperature level.

23 Claims, 8 Drawing Figures 3,643,142

Inventor
Lyle E. McBride Jr.
by Gerald B. Epstein Att'y

Inventor
Lyle E. McBride Jr.
Att'y 3,643,142

AC MOTOR CONTROL SYSTEM UTILIZING A SELECTIVELY ENERGIZABLE SEMICONDUCTOR SWITCH MEANS

This invention relates generally to motor control systems and more particularly is directed to an improved motor control system for energizing and automatically deenergizing the start winding of the motor upon the expiration of a predetermined time interval.

Numerous types of electrical motors are utilized in various industrial applications, as well as in large appliances, in which a main or run winding and an auxiliary or start winding are employed. Typical varieties of such motors include single-phase induction motors, capacitor start motors, split phase resistance motors, etc., in which the start winding is initially energized substantially concurrently with the run winding in order to bring the motor up to running speed upon starting from a deenergized or stopped condition. Usually, it is desirable to arrange for the deenergization of the start winding after starting of the motor has been accomplished and various motor control systems have been provided for effecting deenergization or disconnection of the start winding from the source of power following energization of the motor. Typically, such systems include mechanical or electromechanical switching devices such as relays, bimetal thermostatic switches, etc. However, certain problems often arise when utilizing mechanical or electromechanical switching means, since the associated mechanical movement is accompanied by eventual wear necessitating replacement of the switching apparatus as a normal maintenance task. Furthermore, there exists the possibility that dust or dirt may clog the contacts and that erosion of current-carrying contacts may occur resulting in the eventual failure or improper operation of the system. Moreover, such switching devices may be quite sensitive to variations in supply voltage, ambient temperature, etc., and are often unsuitable for use in adverse environmental situations. In order to avoid such problems, several varieties of thermally sensitive relays have been proposed which require separate resistive heating elements for energizing the thermal relays. However, such devices may, in certain instances, introduce other problems. For example, this type of device may be somewhat uneconomical in view of the separate resistive heating elements required for operation, and may be somewhat cumbersome if miniaturization is desirable in view of the needs for the provision of means for energizing the resistive heating elements, as well as the thermally sensitive relay devices.

Accordingly, it is an object of the present invention to provide an improved motor control system for supplying energizing current to the start winding of a motor for a predetermined time interval.

It is another object of the present invention to provide a motor control system for supply energizing current to a motor start winding for a predetermined time interval and for automatically disrupting the supply of current to the start winding upon the expiration of the time interval.

It is still another object of the present invention to provide an improved motor control system for supplying energizing current to a motor start winding only for a predetermined time interval and for preventing the application of current to the start winding during running of the motor subsequent to the time interval.

It is a further object of the present invention to provide an improved motor control system in which energizing current is supplied to a motor start winding only for a predetermined time interval sufficient to establish running of the motor, and in which a thermal protection means is provided for disrupting the flow of current to the run winding in response to a sensed motor temperature in excess of a preselected temperature level.

Various additional objects and features of the present invention will be readily apparent from the following detailed description and accompanying drawings wherein.

In the following detailed description, corresponding reference characters indicate corresponding elements throughout the several views of the drawings.

Figure 1:
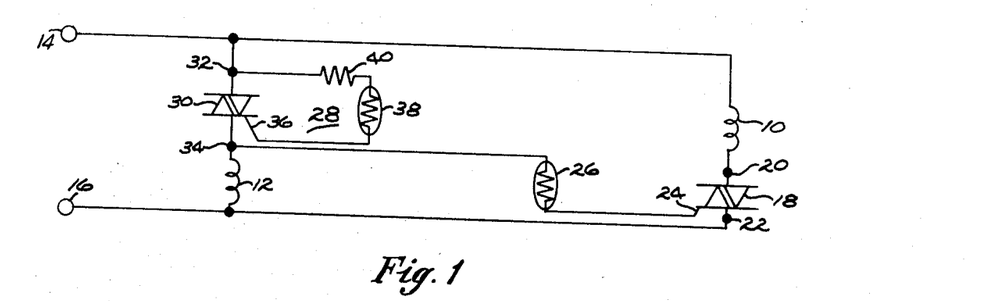
FIG. 1 is a schematic circuit diagram of a motor control system in accordance with the present invention.

Referring generally to the drawings and particularly to FIG. 1, a control system is illustrated for automatically reducing the energizing current being supplied to a start or auxiliary winding 10 of a motor upon the expiration of a predetermined time interval, whereupon full line current is supplied to a run or main winding 12 of the motor. The start and run windings are connected to a pair of power supply terminals 14, 16 which permit connection of the system to a conventional AC power supply (not shown). The system includes a first selectively energizable current switch means 18 having a pair of power terminals 20, 22, and a control terminal 24. The power terminals 20, 22 are serially connected between the start winding and the source of power, while the control terminal is arranged to control the current flow between the power terminals to the start winding. Triggering of the current switch means 18 through the control terminal 24 is effected by the provision of a temperature-responsive element 26 connected to the control terminal 24 for adjusting or controlling the triggering signals being supplied thereto, thereby controlling the energization of the switch means 18. The temperature-responsive element 26 preferably comprises a thermistor adapted to supply triggering current for a predetermined time interval sufficient to effect a transition into its high-resistance or current-limiting mode of operation as a result of self-heating thereof. Such a transition into its high-resistance mode of operation effects a substantial reduction in the flow of current through the thermistor 26, preventing the continued supply of triggering current to the control terminal 24, thereby causing the deenergization or nonconduction of the switch means 18. Consequently, the flow of current to the start winding 10 is disrupted upon the expiration of the predetermined time interval. In this regard, the thermistor is selected having properties such that the time interval required for its transition into its high resistance mode of operation under the electrical conditions anticipated, i.e., current flow, voltage, etc., is sufficient to permit starting of the motor to be effected. In addition, a thermal protection means 28 may be provided electrically coupled to the run winding 12 for sensing motor temperature and disrupting the current being supplied to the run winding in the event of a sensed motor temperature in excess of a preselected temperature level so as to prevent overheating of the motor.

More particularly, the first selectively energizable current switch means 19 preferably comprises a semiconductor current switch device, such as a triac, the gate terminal thereof comprising the control terminal 24. Triggering of the triac is accomplished by utilizing the current-temperature characteristics of the thermistor 26 which preferably comprises a thermistor having a positive temperature coefficient of resistance, commonly referred to as a PTC thermistor. The PTC thermistor 26 is connected to the power supply to supply trigger signals to the triac 18 and in the illustrated embodiment is coupled to the power supply through a second selectively energizable switch 30, which may comprise a part of the thermal protection means, 28. The second selectively energizable switch 30 also preferably comprises a semiconductor current switch device, such as a triac, including a pair of power terminals 32 and 34 and a control terminal or gate 36 for controlling conduction thereof through its power terminals 32, 34. In the illustrated embodiment, the PTC thermistor 26 is connected to the power supply through the power terminals 32, 34 for supplying current to the gate terminal 24 of triac 18.

The triac 30 is normally in a conductive condition during initial energization, as well as during running of the motor, and is arranged to be rendered nonconductive only upon the occurrence of a sensed temperature level in the motor in excess of a preselected temperature level. In this regard, conduction of the triac 30 is controlled by its gate 36, which is coupled to the power supply through a second temperature-sensitive element 38, serially connected to the power supply terminal 14 through a current limiting resistor 40. The second temperature sensitive element 39 also preferably comprises a PTC thermistor. The second PTC thermistor 38 is adapted to conduct current during operation of the motor, but is arranged such that it does not undergo a transition into its high-resistance mode of operation for reducing the current flow therethrough, absent the provision of externally applied heat such as that produced in response to motor overheating. The second PTC thermistor 38 may be disposed in the motor windings, for example, for sensing motor temperature and during usual operation of the motor, both upon initial energization, as well as during running thereof, the triac 30 is maintained in a conductive condition by the current supplied to its gate 36 and supplies current to the run winding 12 to maintain the motor operating and also initially supplies triggering current through the first PTC thermistor 26 to render the first triac 18 conductive in order to effect initial starting of the motor. However, when PTC thermistor 38 is exposed to a temperature level in excess of a preselected level, it begins to self-heat and upon undergoing the transition into its high-resistance mode of operation effects a sufficient reduction in the trigger current being supplied to the gate 36 of triac 30 to deenergize the triac 30, thereby disrupting the current to the run winding 12 and also deenergizing triac 18 to prevent current flow to the start winding 10.

On the other hand, in regard to the starting of the motor, as distinguished from the thermal protection aspects of the control system, in accordance with an important feature of the present invention, the first PTC thermistor 26 is selected such that it self-heats and undergoes the transition into its high-resistance mode of operation without the necessity for externally applied heat. More particularly, the first PTC thermistor 26 initially has a relatively low value of resistance but begins to self-heat and increase in resistance in response to the passage of a current signal therethrough. Upon the expiration of a predetermined period of time, the current flow causes the first PTC thermistor 26 to self-heat sufficiently to reach its anomaly temperature and undergo a transition into its high-resistance mode of operation at which there is an abrupt and large increase in resistance, substantially reducing the current flow therethrough. In addition, the rapid increase in resistance by limiting the current flow also limits additional heating such that the thermistor remains in a relatively stable temperature condition upon the establishment of its high-resistance mode of operation remaining substantially unaffected by changes in ambient temperature or supply voltage, while effectively preventing the further passage of current therethrough.

In operation of a motor control system, such as that illustrated in FIG. 1, the power supply terminals 14, 16 are connected to the source of AC power through an appropriate switch or the like (not shown) for energizing the system. Initially, the triac 30 is triggered by the current flow to its gate electrode through the current limiting resistor 40 and the second PTC thermistor 38 so as to permit current to flow through its power terminals 32, 34. As a result, current flows through the initially unheated first PTC thermistor 26. This current flow through the first PTC thermistor 26 functions as triggering current for the triac 18, and is applied to its gate 24, energizing or rendering the triac 18 conductive so that current is permitted to flow through its power terminals 20, 22 and hence through the start winding 10 to effect starting of the motor. As the triggering current flows through the first PTC thermistor 26, it begins to heat and increase in resistance. Thus, the triggering current is only permitted to flow through the first PTC thermistor 26 for the predetermined time interval whereupon a transition into its high-resistance mode of operation is effected. This transition and abrupt increase in resistance reduces the trigger current to the gate 24 to a level insufficient to maintain conduction of the triac 18. In this regard, the first PTC thermistor 26 is selected such that the predetermined time interval is sufficient to permit triac 18 to remain energized long enough to cause starting of the motor so that upon the removal of current from the start winding of the motor the continued application of current to the run winding is sufficient to permit usual running operation of the motor. Thus, it may be seen that energization of the system automatically effects triggering of the triac 18 so as to permit energization of the start winding for a predetermined time interval sufficient to effect starting of the motor, while preventing further flow of current to the start winding to permit running of the motor in its usual fashion. Furthermore, automatic thermal protection is provided by the thermal protection means 28, since the application of heat to the second PTC thermistor 38 due to motor overheating causes an increase in resistance of the second PTC thermistor as it is heated until it undergoes a transition into its high-resistance mode of operation causing a sufficient reduction in the trigger current to the gate 36 of triac 30 to render the triac 30 nonconductive and disrupt the flow of current to the run winding 12. Consequently, the motor would be rendered inoperative until the motor cools sufficiently to permit current to again flow through the second PTC thermistor 38 to effect firing of triac 30 and permit current to flow through the start winding 10 in the manner previously explained in order to effect starting of the motor. In addition, in accordance with an important feature of the thermal protection means it should be noted that the second PTC thermistor 38 is connected between the gate of triac 30 and one of its power terminals 32. Thus, as the second PTC thermistor 38 is exposed to increased temperature levels such that the current therethrough is reduced and the high-resistance mode of operation is approached the gate current to the triac 30 is similarly reduced and intermittent firing of the triac 30 may be initiated. As a result, an increased voltage is developed across the triac 30 accompanying the current reduction through the second PTC thermistor 38. Since this increased voltage is also established across the second PTC thermistor 38, an acceleration of the self-heating thereof occurs, thereby effecting a relatively rapid and abrupt turnoff of the triac for rapidly disrupting the current flow to the start winding 12.

Figure 2:
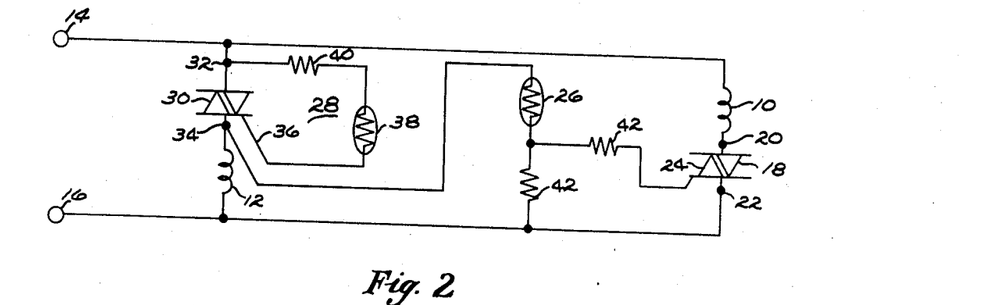
FIG. 2 is a schematic circuit diagram of a modification of the system illustrated in FIG. 1.

In certain instances, it may be advantageous to arrange the power control system such that accelerated self-heating of the first PTC thermistor and transition into its high-resistance mode of operation is achieved. Such an arrangement may be particularly desirable, for example, when rapid self-heating is desired in order to shorten the predetermined time interval required for the transition into high-resistance operation, and thermistors having the desired characteristics are unavailable or prohibitively expensive. More rapid self-heating of the first PTC thermistor is most easily accomplished by increasing the current flow therethrough, although care must be exercised to avoid the application of excessive trigger current to the gate of the triac in order to avoid damaging the triac. Accordingly, an embodiment such as that illustrated in FIG. 2 is provided, in which increased current flow through the first PTC thermistor is achieved, while limiting the current being applied to the triac gate. In this embodiment, similar to FIG. 1, the triac 18 is triggered by the application of a triggering signal through the first PTC thermistor 26 and maintained conductive for the predetermined time interval required for power to be supplied to the start winding 10 to effect starting of the motor. However, in this embodiment, the first PTC thermistor 26 is supplied with a level of current substantially in excess of the trigger current applied to the triac 18 in order to achieve the desired accelerated heating of the first PTC thermistor 26. Thus, the triac 18 is rendered conductive by trigger current passing through the first PTC thermistor 26 until sufficient self-heating of the first PTC thermistor is accomplished to effect a reduction in the flow of current therethrough, rendering the triac 18 nonconductive upon the expiration of the predetermined time interval. In order to limit the current being applied to the gate terminal 24 of the triac 18 to a safe level, the application of a sufficient trigger signal to the gate for driving the triac 18 into conduction, a pair of electrically connected current-limiting resistors 42 and 44 are provided. The resistor 42 is connected between the first PTC thermistor 26 and the gate 24 of the triac 18, while the resistor 44 is connected between the first PTC thermistor 26 and the power terminal 22 of the triac, as shown. It may be noted that the resistance of resistors 42 and 44 is preferably selected such that the initial current flow through the first PTC thermistor 26 prior to the onset of the reduced current flow associated with its operation in a high resistance mode is sufficient to drive the triac 18 into conduction without damaging the triac, while the reduced current flow through the first PTC thermistor 26 during operation in its high-resistance mode may remain in excess of the current level necessary to trigger the triac 18. However, the current-limiting resistor 42 is selected to have a sufficient high resistance value to limit the current applied to gate 24 and thus to prevent further triggering of the triac, when this reduced current level occurs. Thus, a sufficiently high current level flows through the first PTC thermistor 26 for transition into its high resistance mode to be accomplished in an accelerated time interval. The FIG. 2 embodiment is otherwise quite similar to that of FIG. 1 and similarly includes the thermal protection means 28 coupled to the run winding. Operation is also essentially similar in that upon energization of the system, the triac 30 is rendered conductive so that trigger signals are applied to gate 24 of the triac 18 through PTC thermistor 26 and resistor 42, thereby causing current to be supplied to the start winding 10. Upon expiration of the predetermined time interval required for the transition of the PTC thermistor 26 into its high-resistance mode, the trigger current to triac 18 is reduced to render the triac nonconductive, which removes the current from the start winding so that the motor is permitted to run in its usual fashion.

In order to achieve additional control over the firing or energization of the triac connected to the start winding in a system such as that shown in FIG. 2, it may be desirable in certain instances to provide another modified triggering arrangement for the triac. Such a system is illustrated in detail in FIG. 3 and is quite similar to the FIG. 2 embodiment, but further includes an additional triac-firing network 46. More particularly, the triac-firing network 46 is coupled between the first PTC thermistor 26 and the gate terminal 24 of triac 18. The triac firing network includes a capacitor 48, connected across the resistors 42, and 44 at the output of the first PTC thermistor 26. The capacitor 48 is also coupled to the gate terminal 24 through a trigger diode 50. Operation of this embodiment is similar to that described in FIG. 2 to the extent that a relatively large value current signal substantially in excess of that required to trigger the triac 18 is permitted to pass through the first PTC thermistor 26 so as to achieve an accelerated transition into the high-resistance mode of operation. In this connection, the current passing through the first PTC thermistor 26 during operation in its high-resistance mode may be in excess of that required to trigger the triac 18, but the current-limiting resistor 42 is arranged to reduce this current level to a level which is insufficient to trigger the triac, as explained in connection with the FIG. 2 embodiment.

Figure 3:
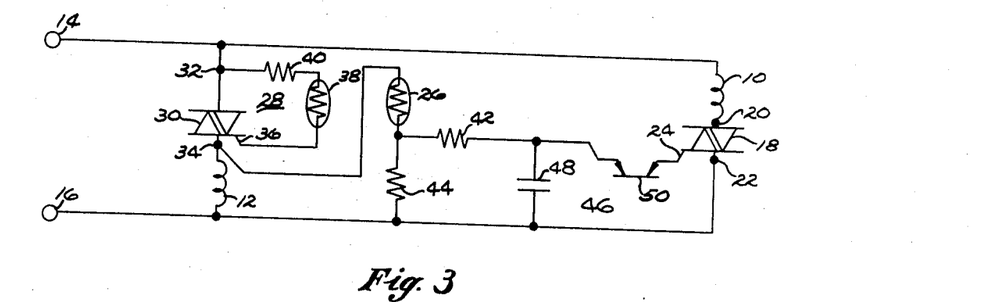
FIG. 3 is a schematic circuit diagram of a further modification of the system illustrated in FIG. 1.

In operation, upon initial energization of the system, triggering current is supplied through the first PTC thermistor 26. This current also passes through the current-limiting resistors 42 and 44 resulting in the establishment of a preselected voltage level across the capacitor 48. This preselected voltage level is established in a time interval dependent upon the time constant of the R-C network defined by capacitor 48 and resistors 42, 44, and is sufficient to trigger the trigger diode 50, which may comprise a breakdown device such as a diac, a silicon bilateral switch, a unijunction transistor, etc., although in the illustrated embodiment a diac is utilized. When the diac 50 is triggered by the voltage established across the capacitor 48, a relatively large amplitude spike of current is applied to the gate 24 of triac 18, rendering the triac instantaneously conductive and driving the triac into hard conduction. As a result, starting current is supplied to the start winding 10 which is serially connected to the triac 18 so as to effect starting of the motor. This starting current is supplied for the predetermined time interval during which the triac 18 remains conductive. Upon the expiration of the predetermined time interval required for the first PTC thermistor to become operable in its high-resistance mode as previously explained, the trigger current to the gate terminal 24 is reduced to a level insufficient to maintain conduction of the triac 18, thereby rendering the triac nonconductive and removing the starting current from the start winding 10. Once again, the predetermined time interval is arranged to be sufficient to effect starting of the motor. Thus, in the illustrated embodiment, the triac 18 is relatively insensitive to the level of current passing through the first PTC thermistor since a relatively large spike of triggering current is applied to the triac gate for initially driving the triac into conduction, the triac being maintained conductive until removal of gate current due to the self-heating of the first PTC thermistor and its consequent transition into its high-resistance mode. In addition, the thermal protection means 28 is operable in the same manner as previously explained, i.e., when the second PTC thermistor 38 is exposed to an excessive temperature level in the motor, the triac 30 is deenergized which disrupts the current being supplied to the motor windings rendering the motor inoperative until sufficient cooling of the second PTC thermistor 38 has been effected as a result of the motor cooling to a safe level.

Figure 4:
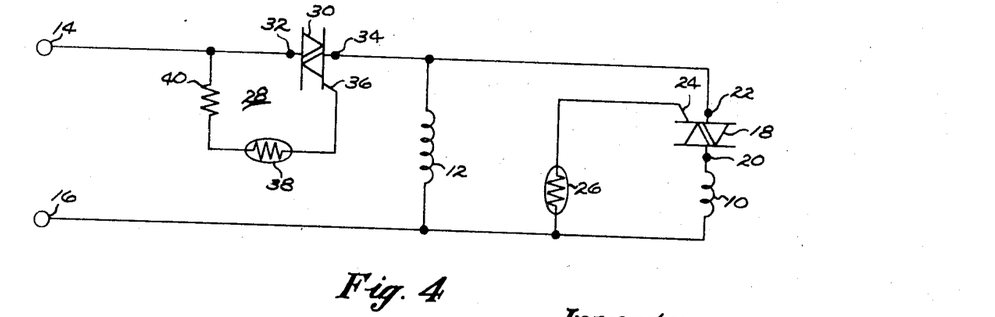
FIG. 4 is a schematic circuit diagram of an alternate embodiment of the system shown in FIG. 1.

Referring now to FIG. 4, a modified motor control system somewhat similar to that shown in FIG. 1 is illustrated. However, in the FIG. 4 embodiment, the thermal protection means 28 is connected in series relationship with both the start winding 10 and the run winding 12 as shown, rather than being serially connected only to the run winding 12. Accordingly, in the event of excessive motor heat sensed by the second PTC thermistor 38, gate current is removed from the triac 30, rendering the triac 30 nonconductive and halting the current flow through its power terminals 32, 34. As a result, the supply of current to both the start winding 10 and the run winding 12 is disrupted to render the motor inoperable until cooling occurs. In this embodiment, the first PTC thermistor 26 is connected between the power terminal 16 and the gate 24 of the triac 18 to permit the application of triggering current through the first PTC thermistor 26 to the gate 24 of triac 18. More particularly, as shown, the power terminals 32, 34 of triac 30 are connected between the power terminal 14 and in series relationship with the parallel-connected start winding 10 and run winding 12. Accordingly, upon initial energization of the system the triac 30 is triggered and rendered conductive supplying current to the run winding 12. However, current cannot be supplied to the start winding 10 until the triac 18 is rendered conductive. This is accomplished by the current which passes through the first PTC thermistor 26 to the gate terminal 24 of the triac 18. As a result, current is permitted to flow through the power terminals 20, 22 of the triac 18 to the start winding 10 to effect starting of the motor. The triac 18 remains conductive for a predetermined time interval, as previously explained, sufficient for the start winding to effect running of the motor, whereupon the first PTC thermistor 26 becomes operable in its high-resistance mode to effect a reduction in the current being supplied to the gate 24 of triac 18 to a level insufficient to maintain conduction thereof. Thus, the triac 18 is rendered nonconductive upon the expiration of this time interval and the start winding is deenergized to permit the power being supplied through power supply terminals 14, 16 to be supplied solely to the run winding 12.

Figure 5:
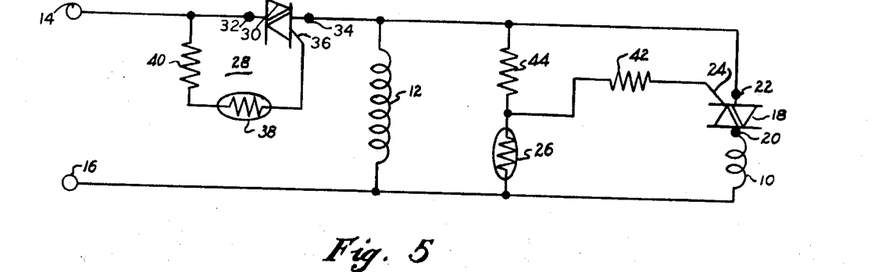
FIG. 5 is a schematic circuit diagram of a modification of the system illustrated in FIG. 4.

Referring to FIG. 5, a modification of the control system illustrated in FIG. 4 is set forth in which the pair of current-limiting resistors 42, 44 are provided similarly to the FIG. 2 embodiment. In this connection, the thermal protection means 28 is again connected in series with the parallel-connected start winding 10 and run winding 12 so as to disrupt the current being supplied to both windings in the event of a sensed excessive motor temperature. Similarly, as explained in connection with the FIG. 2 embodiment, the current limiting resistors 42 and 44 are provided so that a substantially higher average power level may be supplied through the PTC thermistor 26 to the gate 24 of triac 18 without harming the gate so as to achieve an accelerated and positive switching or transition of the first PTC thermistor 26 into its high-resistance mode of operation without the attendant delay or lingering action which may occur in certain instances during the transition into the high-resistance mode of operation. Similarly, to the FIG. 2 embodiment, the reduced current flow through the PTC thermistor 26, during operation in its high-resistance mode, may be in excess of the trigger current required for the triac 18, but due to the presence of the resistors 42 and 44 this reduced current level is insufficient to maintain the triac 18 in a conductive state. Accordingly, the triac 18 is rendered nonconductive due to the reduction in current flow through the PTC thermistor 26 upon the expiration of the predetermined time interval necessary for the initiation of operation in its high-resistance mode, thereby effecting starting of the motor. Thus, it may be seen that the FIG. 5 embodiment is quite similar to that shown in FIG. 2, except for the connection of the thermal protection means 28 in series relationship with both the run winding 12 and the start winding 10.

Figure 6:
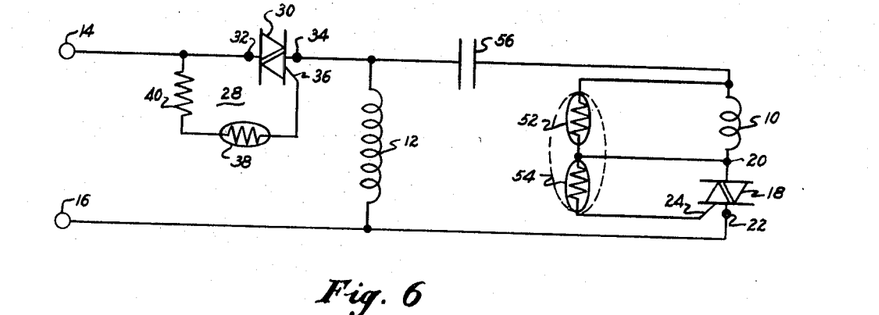
FIG. 6 is a schematic circuit diagram of an alternate embodiment of a system in accordance with the present invention.

Another modification of the motor control system is illustrated in FIG. 6. In this embodiment, the thermal protection means 28 is similarly arranged in series relationship with both the start winding 10 and the run winding 12 so as to disrupt the current flow to both windings in response to a sensed excessive motor temperature. However, in this embodiment the first PTC thermistor is replaced by a pair of PTC thermistors 52 and 54 which are electrically connected and in thermal communication with each other, as shown. In this connection, the resistance of thermistor 52 begins to increase rapidly and approach operation in its high-resistance mode at a first predetermined temperature, while the PTC thermistor 54 beings to increase rapidly and approach operation in its high-resistance mode at a second predetermined temperature which is substantially lower than the first predetermined temperature. The PTC thermistor 54 is coupled to the gate 24 of the triac 18 so as to control the triggering thereof, while the PTC thermistor 52 is connected directly across the start winding 10. In addition, if desired, a capacitor 56 may be provided connected between the start winding 10 and the run winding 12, as shown, to achieve a desired phase relationship between the start and run windings so as to aid in the starting of the motor. The thermal protection means 28, as shown, is connected in series relationship with both the start winding 10 and the run winding 12 so as to simultaneously disrupt the power to both windings in the event of an excessive motor temperature, and is substantially similar to the thermal protection means described in detail in the preceding embodiments. In addition, it may be noted that a capacitor such as the capacitor 56 illustrated in connection with FIG. 6, may be provided serially coupled to the start winding in any of the embodiments illustrated in FIGS. 1–8 in order to achieve capacitor start operation, if desired.

An important advantage resides in the embodiment illustrated in FIG. 6 in that automatic restarting of the motor may be effected in the event of temporary stalling due to overload, or the like, as will now be explained in detail. More particularly, upon the application of power to the power terminals 14, 16, the start winding 10 is energized for a time interval sufficient to effect starting of the motor similarly to the previous embodiments. In this regard, the triac 30 of the thermal protection means 28 is rendered conductive and passes current through its power terminals 32, 34, and through the starting capacitor 56 to the gate 24 of triac 18 through the start winding 10 and through the thermistor 54 in order to trigger or fire the triac 18 to permit current to flow through the start winding 10 while the triac 18 remains conductive to effect starting of the motor. Since the PTC thermistor 54 is connected to the gate 24 of triac 18 for supplying triggering signals thereto, as the PTC thermistor 54 approaches the temperature at which its resistance increases a substantial reduction in the triggering current being applied to the gate 24 results. In addition, as running of the motor ensues, a voltage is induced across the start winding 10, this voltage also being established across the PTC thermistor 52, which is connected directly across the start winding. This induced voltage heats the PTC thermistor 52 to cause the application of sufficient heat to the thermally coupled thermistor 54 to cause the latter to become operational in its high resistance and thus essentially nonconductive mode. The reduction in current flow through the PTC thermistor 54 results in the application of insufficient trigger current, to the triac 18, which is thus rendered nonconductive so as to effect deenergization of the start winding 10; so that the motor may continue to run in the usual manner. Furthermore, in accordance with an important feature of this embodiment, if the motor should become temporarily stalled due to an overload, for example, automatic restarting of the motor is accomplished. In this connection, upon deenergization of the motor due to the stalled condition the voltage induced across the start winding 10 during running of the motor is removed. Consequently, the PTC thermistor 52 is no longer subjected to this voltage and thermistors 52 and 54 are permitted to cool to a point at which current may again flow through the PTC thermistor 52 and thence to the control terminal 24 of triac 18, which is rendered conductive, effecting the reapplication of a starting signal through the start winding 10 for a time interval sufficient to effect starting of the motor, in the manner previously explained. Thus, the PTC thermistors 52 and 54 function somewhat analogously to an electromechanical relay but without requiring any moving parts for accomplishing such a function.

Figure 7:
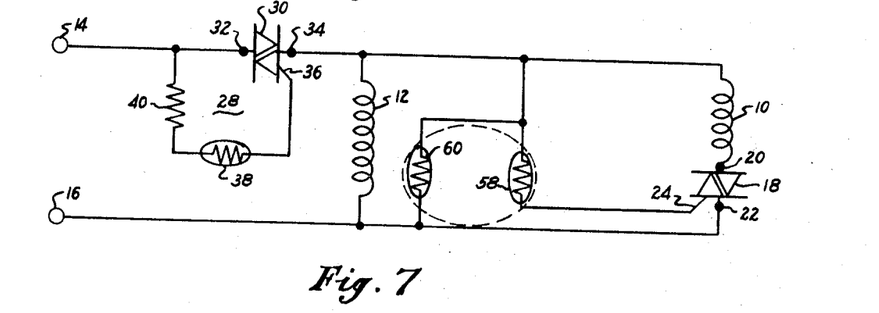
FIG. 7 is a schematic circuit diagram of another alternate embodiment of a system in accordance with the present invention.

Referring now to FIG. 7, another modification of a system similar to that illustrated in FIG. 6 is shown. More particularly, in this embodiment, the thermal protection means 28 is similarly connected in series relationship with both the start winding 10 and the run winding 12 for disrupting power to both windings in the event of a sensed excessive motor temperature. In addition, this embodiment is similarly arranged such that a triggering current may be applied to the control element 24 of the triac 18 serially connected to the start winding 10 for a predetermined time interval so as to effect starting of the motor. In addition, in this embodiment, a positive and abrupt disruption of such triggering current is effected substantially eliminating the possibility of delay or lingering incident to the transition into the high-resistance mode of operation of the PTC thermistor. More particularly, in certain instances during the transition of a PTC thermistor into its high-resistance mode of operation an additional time delay may occur due to the fact that self-heating may begin to slow as the PTC thermistor approaches and passes through the anomaly point at which it undergoes the transition into its high-resistance mode of operation. The embodiment illustrated in FIG. 7 sets forth an arrangement for achieving a positive transition and avoiding such a delay. In this regard, a PTC thermistor 58 having a first preselected anomaly temperature at which transition into its high-resistance mode of operation is initiated is serially connected between the power terminals 32, 34 of the triac 30 and the gate terminal 24 of triac 18. Thus, triggering current may be applied to the triac 18 so as to effect conduction thereof, thereby permitting the supply of current to the start winding 10 for a predetermined time interval until sufficient heating of the PTC thermistor 58 is effected to cause operation in its high-resistance mode, causing the removal of triggering current from the triac 18 so as to deenergize the start winding 10 serially connected to the power terminals 20, 22 of the triac 18, in the manner previously explained. In addition, a PTC thermistor 60 having a second preselected anomaly temperature which is higher than the anomaly temperature of the PTC thermistor 58, is electrically connected across the run winding 12 and is connected to the PTC thermistor 58, the PTC thermistors 58 and 60 being maintained in thermal communication with each other, as shown. As a result, upon initial energization of the control system illustrated, the triac 30 is rendered conductive similarly to the preceding embodiments and current passes through its power terminals 32, 34 and is applied to the PTC thermistors 58, 60 which are coupled thereto. The current passing through the PTC thermistor 58 is applied to the gate 24 of the triac 18 to fire the triac for a predetermined time interval until the PTC thermistor 58 undergoes transition into high-resistance operation, current being supplied to the start winding 10 to effect motor starting during this time interval. As current is being applied to the PTC thermistors 58, 60 during this time interval, the PTC thermistor 60, which has a higher anomaly temperature, applies additional heat to the PTC thermistor 58 so as to accelerate the transition into high-resistance operation of the PTC thermistor 58, thereby causing a smooth and positive removal of triggering current and deenergization of the triac 18 upon the expiration of the predetermined time interval required for effecting starting of the motor. Furthermore, since the PTC thermistor 60 is connected across the run winding, a voltage is induced across the PTC thermistor 60 during running of the motor which causes continued heating of the PTC thermistor 60, such heating also being applied to the thermally coupled PTC thermistor 58 during running of the motor. Thus, the PTC thermistor 58 is maintained in a heated state during running of the motor to prevent the reapplication of trigger current to the gate of triac 18, while current is being supplied to the run winding 12 maintaining the PTC thermistor 60 in a heated condition. The thermal protection means 28, similarly, functions in the manner previously described to disrupt current flow to the run and start windings in the event of motor overheating.

Figure 8:
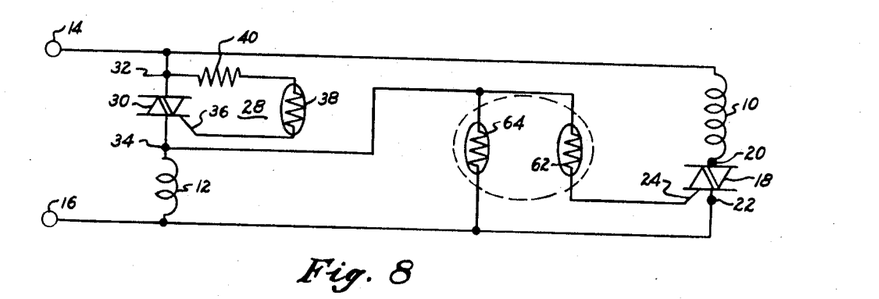
FIG. 8 is a schematic circuit diagram of a modification of the system illustrated in FIG. 7.

Referring now to FIG. 8, another modification of a motor control system in accordance with the present invention is illustrated. In this embodiment, the thermal protection means 28 is connected in series relationship with the run winding 12 as shown. This embodiment achieves essentially the same operational result as accomplished by the FIG. 7 embodiment in that a pair of electrically connected PTC thermistors 62 and 64 are provided in thermal communication with each other for coupling the gate 24 of triac 18 to a source of power for a predetermined time interval in order to effect starting of a motor. The PTC thermistor 62 has a substantially lower anomaly temperature than the PTC thermistor 64. Accordingly, during operation, additional heating is applied to the PTC thermistor 62 by the PTC thermistor 64 to effect an accelerated and positive transition into the high-resistance mode of operation of PTC thermistor 62, which is coupled to the gate 24 of triac 18. Thus, a shortened time interval during which a trigger signal is applied to the triac 18, as well as a positive switching action for effecting energization of the start winding is achieved. Operation of the system illustrated in FIG. 8 is quite similar to that of the FIG. 7 embodiment. More particularly, upon the application of power to the system through the power terminals 14, 16 the triac 30 is energized and current is permitted to flow through its power terminals 32, 34 to the parallel connected PTC thermistors 62 and 64. As a result, current flows through the initially cold PTC thermistor 62 to the gate terminal 24 of triac 18 so as to trigger the triac and permit the flow of current through the start winding 10 for the predetermined time interval necessary for PTC thermistor 62 to undergo transition into its high-resistance mode of operation. Upon the expiration of this time interval, the triggering current to the control terminal 24 is reduced to a level insufficient to maintain conduction of the triac 18 due to the increased resistance of PTC thermistor 62, thereby effecting deenergization of the start winding 10. Furthermore, the PTC thermistor 64 applies additional heating to the PTC thermistor 62 during this time interval so as to assure a smooth and positive transition into high-resistance operation without the attendant delay which may in certain instances, accompany the transition into high-resistance operation. Similarly, during running of the motor, sufficient power is applied to the PTC thermistor 64 due to its connection across the run winding 12 to cause it to continue to apply heat to the PTC thermistor 62 to maintain the latter in its high-resistance mode of operation, thereby precluding the application of triggering current to the triac 18 during usual running of the motor.

Thus, several novel embodiments of a motor control system have been described in which thermally responsive elements are utilized for controlling the operation of semiconductor current switch devices so as to permit the application of starting current to the start winding of a motor for a predetermined time interval, whereupon the starting current is removed from the start winding due to a change in conductive state of the thermally responsive element to permit running of the motor in the usual manner. In addition, thermal protection means have been described similarly utilizing thermally responsive means for controlling the operation of semiconductor switch devices for disrupting the supply of power to the motor in the event of an excessive sensed motor temperature.

Various changes and modifications in the above described embodiment will be readily apparent to those skilled in the art and any such changes or modifications are deemed to be within the spirit and scope of the invention as set forth in the appended claims.

What is claimed is:

1. A system for controlling the operation of an induction motor having a start winding and a run winding comprising
   a first selectively energizable semiconductor current switch means having a pair of power terminals and a control terminal for controlling current flow between said power terminals, said power terminals being serially connected between the start winding and a source of power,
   trigger means including a first temperature-responsive element having a resistance which varies in response to the temperature thereof and being adapted for operation in a current-limiting self-heating mode coupled to said control terminal for controlling the flow of current thereto so as to control the energization of said first switch means and being adapted to conduct triggering current to said control terminal to render said first switch means conductive for a predetermined time interval until current limiting operation thereof is initiated causing a reduction in the flow of current therethrough so as to render said first switch means nonconductive after said predetermined time interval, said first temperature-responsive element being coupled to said run winding so as to receive sufficient current subsequent to said predetermined time interval to remain operational in its self-heating mode to preclude additional current flow to the start winding during running of the motor, and
   means for energizing the start winding and said trigger means so as to apply triggering current to said first temperature-responsive element to energize said switch means and permit current flow to the start winding during said predetermined time interval, thereby effecting starting of the motor.

2. A system for controlling the operation of an induction motor having a start winding and a run winding comprising
   a first selectively energizable semiconductor current switch means having a pair of power terminals and a control terminal for controlling current flow between said power terminals, said power terminals being serially connected between the start winding and a source of power, trigger means including a first temperature-responsive element adapted for operation in a current-limiting mode coupled to said control terminal for controlling the flow of current thereto so as to control the energization of said first switch means, said first temperature-responsive element being adapted to conduct triggering current to said control terminal to render said first switch means conductive for a predetermined time interval until current-limiting operation thereof is initiated causing a reduction in the flow of current therethrough so as to render said first switch means nonconductive after said predetermined time interval said first temperature-responsive element comprising a first PTC thermistor adapted for operation in a self-heating mode and being coupled to the run winding so that sufficient current is applied to said first PTC thermistor during running of the motor subsequent to said predetermined time interval to maintain said first PTC thermistor operational in its self-heating mode thereby precluding additional current flow to the start winding during running of the motor, and means for energizing the start winding and said trigger means so as to apply triggering current to said first temperature-responsive element to energize said switch means and permit current flow to the start winding during said predetermined time interval, thereby effecting starting of the motor.

3. A system in accordance with claim 2 wherein said first current switch means comprises a first triac having its gate connected in series with said first PTC thermistor, said triac being rendered conductive upon energization of said trigger means and being rendered nonconductive by a reduction in current flowing through said first PTC thermistor upon the expiration of said predetermined time interval.

4. A system in accordance with claim 3 wherein a thermal protection means is provided for selectively disrupting the flow of current to the run winding in response to a sensed motor temperature in excess of a preselected temperature level, said thermal protection means including a second selectively energizable semiconductor current switch means, having a pair of power terminals and a control terminal for controlling current flow between said power terminals, said power terminals being coupled between the source of power and the run winding, and a second temperature-responsive element mounted in thermal communication with the motor and electrically connected to said control terminal for reducing the current flow thereto to a level inadequate to maintain said second switch means conductive in response to a sensed temperature in excess of said preselected temperature level.

5. A system in accordance with claim 4 wherein said power terminals of said second switch means are in series relationship with the run winding for selectively disrupting the flow of power thereto.

6. A system in accordance with claim 4 wherein said power terminals of said second switch means are in series relationship with the run winding and the start winding for selectively disrupting the flow of power to both said run winding and said start winding in response to a sensed motor temperature in excess of said preselected temperature level.

7. A system in accordance with claim 4 wherein said second switch means comprises a second triac and the second temperature-responsive element comprises a second PTC thermistor serially connected to the gate of said second triac, said second PTC thermistor being adapted to pass sufficient current to maintain said second triac conductive in the absence of a sensed temperature in excess of said preselected temperature level and to reduce the current level to the gate of said second triac to a level insufficient to maintain conduction of said triac in response to a sensed temperature in excess of said preselected temperature level, said sensed temperature in excess of said preselected temperature level initiating operation of said second PTC thermistor in a high-resistance mode.

8. A system in accordance with claim 7 wherein said second PTC thermistor is connected between the gate and one of the power terminals of said second triac so that the voltage across said second triac is established across said second PTC thermistor to increase the heating thereof in response to a reduction in the conduction of said second triac caused by an increase in the resistance of said second PTC thermistor, thereby effecting an abrupt and positive deenergization of said triac in response to a sensed temperature in excess of said preselected temperature level.

9. A system for controlling the operation of an induction motor having a start winding and a run winding comprising
a first selectively energizable semiconductor switch device having a pair of power terminals and a control terminal for controlling the flow of current between said power terminals in response to a triggering current, said power terminals being connected between the start winding and a source of power;
trigger means, including a first PTC thermistor adapted for operation in a high-resistance, self-heating mode coupled to said control terminal for controlling the application of triggering current thereto, said first PTC thermistor being adapted to conduct current substantially in excess of said triggering current prior to the initiation of operation in its high-resistance mode so as to abruptly energize said switch device for a predetermined time interval, high-resistance operation of said first PTC thermistor being positively initiated upon expiration of said predetermined time interval effecting a reduction in the flow of current therethrough rendering said switch device nonconductive, said first PTC thermistor being coupled to the run winding to receive sufficient current during running of the motor subsequent to the predetermined time interval to maintain said first PTC thermistor in its high-resistance mode, and current-limiting means connected between said first thermistor and said switch device for limiting the current applied to said control terminal to a level sufficient to maintain said switch device conductive only until high-resistance operation of said first PTC thermistor is effected, said current-limiting means being effective to limit triggering current supplied to said control terminal when the current flow through said first PTC thermistor is reduced due to high-resistance operation thereof to effect abrupt energization of said switch device, and
means for energizing the start winding and said trigger means so as to apply triggering current through said first PTC thermistor to energize said switch device, whereby current flow is effected through the start winding during said predetermined time interval.

10. A system in accordance with claim 9 wherein said current-limiting means comprises resistance means.

11. A system in accordance with claim 10 wherein said current-limiting means includes at least two electrically connected resistors coupled between said first PTC thermistor and said control terminal and between said first PTC thermistor and one of said power terminals of said switch device respectively.

12. A system for controlling the operation of an induction motor having a start winding and a run winding comprising
a first selectively energizable semiconductor switch device having a pair of power terminals and a control terminal for controlling the flow of current between said power terminals in response to a triggering current, said power terminals being connected between the start winding and a source of power,
trigger means, including a first PTC thermistor adapted for operation in a high-resistance mode coupled to said control terminal for controlling the application of triggering current thereto, said first PTC thermistor being adapted to conduct current substantially in excess of said triggering current prior to the initiation of operation in its high-resistance mode so as to abruptly energize said switch device for a predetermined time interval, high-resistance operation of said first PTC thermistor being positively initiated upon expiration of said predetermined time interval effecting a reduction in the flow of current therethrough rendering said switch device nonconductive, said first PTC thermistor being coupled to the run winding to receive sufficient current during running of the motor subsequent to said predetermined time interval to maintain said first PTC thermistor operational in its high-resistance mode, and current-limiting means including at least two electrically connected resistors coupled between said first PTC thermistor and said control terminal and between said first PTC thermistor and one of said power terminals of said switch device respectively for limiting the current applied to said control terminal to a level sufficient to maintain said switch device conductive only until high-resistance operation of said first PTC thermistor is effected, said current-limiting means being effective to limit triggering current supplied to said control terminal when the current flow through said first PTC thermistor is reduced due to high-resistance operation thereof to effect abrupt deenergization of said switch device, and means for energizing the start winding and said trigger means so as to apply triggering current through said first PTC thermistor to energize said switch device, whereby current flow is effected through the start winding during said predetermined time interval.

13. A system in accordance with claim 12 wherein said first switch device comprises a first triac having its gate connected in series with said first PTC thermistor through one of said resistors, said first triac being rendered nonconductive due to a reduction in the voltage across said resistors as high-resistance operation of said first PTC thermistor is initiated.

14. A system in accordance with claim 13 wherein a thermal protection means is provided for selectively disrupting the flow of current to the run winding in response to a sensed motor temperature in excess of a preselected temperature level, said thermal protection means including a second selectively energizable semiconductor current switch means having a pair of power terminals and a control terminal for controlling current flow between said power terminals, said power terminals being coupled between the source of power and the run winding, and a temperature-responsive means mounted in thermal communication with the motor and electrically connected to said control terminal for reducing the current flow thereto to a level inadequate to maintain said second switch means conductive in response to a sensed temperature in excess of said preselected temperature level.

15. A system in accordance with claim 14 wherein said power terminals of said second switch means are serially connected to the run winding for selectively disrupting the flow of power thereto.

16. A system in accordance with claim 14 wherein said power terminals of said second switch means are in series relationship with the run winding and the start winding for selectively disrupting the flow of power to the start winding and to the run winding in response to a sensed motor temperature in excess of said preselected temperature level.

17. A system in accordance with claim 14 wherein said second switch means comprises a second triac and the temperature-responsive means comprises a second PTC thermistor serially connected to the gate of said second triac, said second PTC thermistor being adapted to pass sufficient current to maintain said second triac conductive in the absence of a sensed temperature in excess of said preselected temperature and to reduce the current level to the gate of said second triac to a level insufficient to maintain conduction of said second triac in response to a sensed temperature in excess of said preselected temperature, said sensed temperature in excess of said preselected temperature effecting the initiation of operation of said second PTC thermistor in a high-resistance mode.

18. A system in accordance with claim 17 wherein said second PTC thermistor is connected between the gate and one of the power terminals of said second triac so that the voltage appearing across said second triac is established across said second PTC thermistor to increase the self-heating thereof in response to a reduction in the conduction of said second triac thereby effecting an abrupt and positive deenergization of said second triac in response to an increase in sensed temperature.

19. A system in accordance with claim 13 wherein triac-firing means including a trigger diode and a capacitor are coupled to the gate of said triac, said capacitor being connected across said resistors for storing the voltage appearing across said resistors until a sufficient voltage level is established across said capacitor to fire said trigger diode, thereby applying a trigger pulse to abruptly energize said triac.

20. A system for controlling the operation of an induction motor having a start winding and a run winding comprising a selectively energizable semiconductor current switch device having a pair of power terminals and a control terminal for controlling the flow of current between said power terminals in response to a triggering current, said power terminals being serially connected between the start winding and a source of power, trigger means including a first PTC thermistor adapted for operation in a high-resistance mode at a first predetermined temperature coupled to said control terminal for controlling the application of triggering current thereto, said first PTC thermistor being adapted to conduct triggering current to said control terminal for a time interval required to permit sufficient heating of said first PTC thermistor to effect operation in its high-resistance mode reducing the triggering current flow therethrough so as to render said switch device nonconductive, and a second PTC thermistor adapted for operation in a high-resistance mode at a second predetermined temperature in excess of said first predetermined temperature connected across the start winding and electrically connected to said first PTC thermistor, said second PTC thermistor being in thermal communication with said first PTC thermistor, so as to apply heat thereto during said time interval, to assure a positive transition into high-resistance operation of said first PTC thermistor, thereby effecting abrupt deenergization of said switch device upon the expiration of said time interval, means for energizing the start winding and said trigger means so as to effect the application of triggering current through said first and second PTC thermistors to said control terminal only until expiration of said time interval, and means for maintaining said second PTC thermistor in its high-resistance mode subsequent to said time interval and during the application of power to the run winding so as to prevent the application of triggering current to said switch device and for effecting reapplication of triggering current to said switch device upon cooling of said first and second PTC thermistors permitting triggering current to flow therethrough.

21. A system in accordance with claim 20 wherein said selectively energizable switch device comprises a triac having its gate terminal connected in series with said first PTC thermistor, said triac being rendered nonconductive by a reduction in triggering current flowing through said first PTC thermistor.

22. A system in accordance with claim 21 wherein a thermal protection means is provided for sensing motor temperature in excess of a preselected temperature level and selectively disrupting the flow of current to the run winding and to the start winding until sufficient cooling of the motor occurs to permit automatic reapplication of triggering current to the start winding through said first and second PTC thermistors.

23. A system for controlling the operation of an induction motor having a start winding and a run winding comprising a selectively energizable semiconductor current switch device having a pair of power terminals and a control terminal for controlling the flow of current between said power terminals in response to a triggering current, said power terminals being serially connected between the start winding and a source of power, trigger means including a first PTC thermistor adapted for operation in a high-resistance mode at a first predetermined temperature coupled to said control element, said first PTC thermistor being adapted to conduct triggering current to said control element for a preselected time interval until the increase in resistance thereof is sufficient to effect a reduction in triggering current flow to render said switch device nonconductive, and a second PTC thermistor adapted for operation in a high-resistance mode at a second predetermined temperature in excess of said first predetermined temperature, said second PTC thermistor being connected across the run winding and in thermal communication with said first PTC thermistor so as to apply heat to said first PTC thermistor during said predetermined time interval to assure a positive transition into high-resistance operation thereof, permitting abrupt deenergization of said switch device upon expiration of said predetermined time interval, means for energizing the start winding and said trigger means to supply triggering current to said control terminal through said first PTC thermistor for said predetermined time interval and for supplying current to said second PTC thermistor to effect heating thereof, and means for maintaining said second PTC thermistor in an energized condition to effect the application of sufficient heat to said first PTC thermistor to maintain said first PTC thermistor operational in a high-resistance mode during running of the motor subsequent to said predetermined time interval.

* * * * *

Disclaimer 3,643,142.—*Lyle E. McBride, Jr.*, Norton, Mass. A. C. MOTOR CONTROL SYSTEM UTILIZING A SELECTIVELY ENERGIZABLE SEMICONDUCTOR SWITCH MEANS. Patent dated Feb. 15, 1972. Disclaimer filed Feb. 25, 1974, by the assignee, *Texas Instruments Incorporated*.

Hereby enters this disclaimer to claims 1 and 9 of said patent.

[*Official Gazette August 27, 1974.*]